US012574757B2

(12) United States Patent
Thubert et al.

(10) Patent No.: US 12,574,757 B2
(45) Date of Patent: Mar. 10, 2026

(54) BROADCAST OPERATIONS BY A SELECTED SUBSET OF ACCESS POINTS

(71) Applicant: Cisco Technology, Inc., San Jose, CA (US)

(72) Inventors: Pascal Thubert, Roquefort-les-Pins (FR); Eric Michael Levy-Abegnoli, Valbonne (FR); Jean Philippe Vasseur, Issy les Moulineaux (FR); Patrick Wetterwald, Mouans Sartoux (FR); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 341 days.

(21) Appl. No.: 18/482,168

(22) Filed: Oct. 6, 2023

(65) Prior Publication Data

US 2024/0163685 A1 May 16, 2024

Related U.S. Application Data

(60) Provisional application No. 63/383,168, filed on Nov. 10, 2022.

(51) Int. Cl.
*H04W 16/24* (2009.01)
*H04W 48/12* (2009.01)
(52) U.S. Cl.
CPC ........... *H04W 16/24* (2013.01); *H04W 48/12* (2013.01)
(58) Field of Classification Search
None
See application file for complete search history.

(56) References Cited

U.S. PATENT DOCUMENTS

| | | | |
|---|---|---|---|
| 11,228,923 B2 * | 1/2022 | Bogatin | H04B 7/0417 |
| 2006/0193334 A1 | 8/2006 | Hazra et al. | |
| 2017/0251432 A1 | 8/2017 | Park et al. | |
| 2018/0376399 A1 | 12/2018 | Zhou | |
| 2022/0086808 A1 | 3/2022 | Monajemi et al. | |
| 2022/0201596 A1 | 6/2022 | Zhou et al. | |
| 2022/0272630 A1 * | 8/2022 | Shafin | H04W 52/0219 |
| 2022/0330136 A1 | 10/2022 | Siraj et al. | |

FOREIGN PATENT DOCUMENTS

WO          2020098145 A1      5/2020

OTHER PUBLICATIONS

International Search Report and Written Opinion for International Application No. PCT/US2023/079276, mailed Mar. 26, 2024, 17 Pages.
Ruckus: "Network Scaling Choosing the Right No. of SSIDs", White Paper, Jun. 1, 2013, XP093139934, Retrieved from the Internet: https://www.commscope.com/globalassets/digizuite/1566-1396-wp-network-scaling-ssid.pdf on Mar. 11, 2024, 3 Pages, the whole document.

* cited by examiner

*Primary Examiner* — Hong S Cho
(74) *Attorney, Agent, or Firm* — Merchant & Gould P.C.

(57) ABSTRACT

Broadcast operations by a selected subset of Access Points (APs) may be provided. A first plurality of APs to perform broadcast may be selected from a plurality of APs. Next, a plurality of client devices may be moved from a second plurality of APs to the first plurality of APs during a broadcast period. Then, the plurality of client devices may be moved to the second plurality of APs from the first plurality of APs after the broadcast period.

20 Claims, 8 Drawing Sheets

200

205 Start

210 Select, from a plurality of Access Points (APS), a first plurality of APS to perform broadcast 220 Move a plurality of client devices from a second plurality of APS to the first plurality of APS during a broadcast period 230 Move the plurality of client devices to the second plurality of APS from the first plurality of APS after the broadcast period 240 End P.I. = Power Level

P.I.1
P.I.2
P.I.3
P.I.4
P.I.5
P.I.6

BROADCAST OPERATIONS BY A SELECTED SUBSET OF ACCESS POINTS

RELATED APPLICATION TECHNICAL FIELD

Under provisions of 35 U.S.C. § 119(e), Applicant claims the benefit of U.S. Provisional Application No. 63/383,168 filed Nov. 10, 2022, which is incorporated herein by reference.

TECHNICAL FIELD

The present disclosure relates generally to providing broadcast operations by a selected subset of Access Points.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
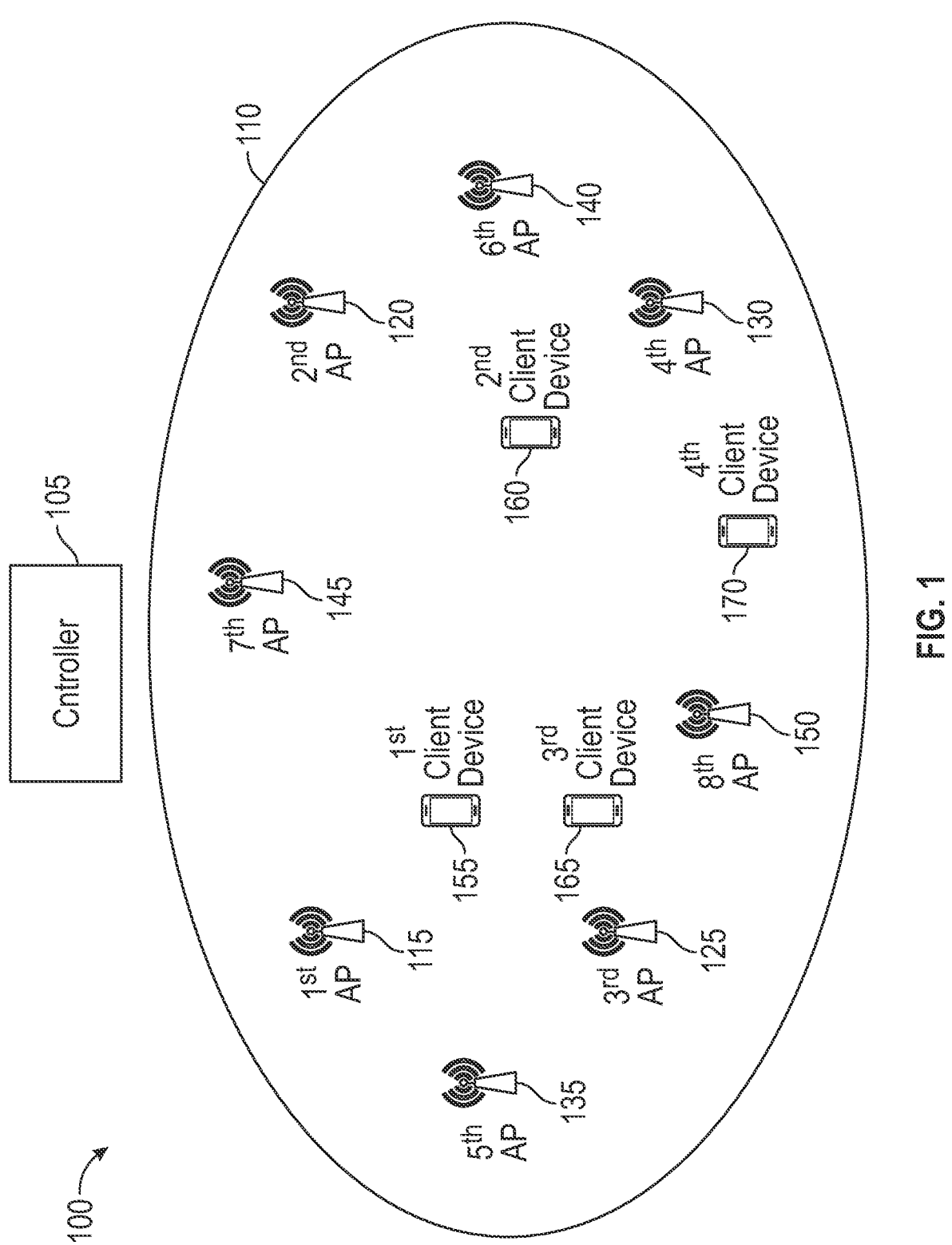
FIG. 1 is a block diagram of an operating environment for providing broadcast operations by a selected subset of Access Points.

Broadcast operations by a selected subset of Access Points (APs) may be provided. A first plurality of APs to perform broadcast may be selected from a plurality of APs. Next, a plurality of client devices may be moved from a second plurality of APs to the first plurality of APs during a broadcast period. Then, the plurality of client devices may be moved to the second plurality of APs from the first plurality of APs after the broadcast period.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Wireless broadcast messages may be sent at the lowest basic rate. At one time this may have been practical because the radius of a single cell would match a radius of an area where general announcements could be heard. In a dense environment aimed at high performance, however, the range and interference domain of a broadcast may exceed the unicast range for unicast transmissions as the client devices may leverage short range APs for better performances.

The aforementioned process may be incompatible with highly efficient networks. Beacons alone may consume up to 2% of the airtime of each AP radio per Service Set Identifier (SSID), without carrying any significant data payload. Data transporting broadcasts may consume the maximum possible airtime for each carried byte, while other systems my try to maximize each client device and cell data throughput.

With denser deployments, the airtime cost of the broadcasts may increase linearly with the number of neighboring APs on different channels, and may double for each new Basic Service Set Identifier (BSSID) (either a new SSID on an existing radio, or an Overlapping Basic Service Set (OBSS) radio) on a given channel, while the number of interfered APs augments to the square. As higher density may be needed to meet the throughput for new applications like Virtual Reality (VR)/Augmented Reality (AR), broadcasts may clog the medium and interfere widely, defeating the purpose of the high-density deployment. Yet the value of each broadcast may stay limited to network information and clock synchronization (beacon) or general announcement (data broadcasts).

Data transporting broadcasts may or may not benefit each of the receiving client devices, to the point that most networks end up offering options to block entirely data broadcasts over the air, and proxies may be deployed in the APs to filter broadcast packets that may not interest any of the associated client devices. Generic proxies may be useful when they broadcast only well-known basic operational functions that may be proxied by the AP, but fail when the broadcasts are application-specific (thus needed by some clients), forcing the administrator to establish a binary choice (e.g., blocking or allowing broadcast forwarding).

Embodiments of the disclosure may reduce the number of broadcasting AP on a given floor while maximizing utility area of each broadcast message, leaving other APs to perform other tasks. Embodiments of the disclosure may select a dominating set of APs to perform the broadcast on behalf of all others. The client devices may be instructed to switch to an alternate AP for the synchronized broadcast periods, after which they may resume unicast exchanges with their preferred AP. If filtering takes place (e.g., a broadcast is sent as unicast) then the AP that has the client device associated may remain responsible for the unicast, and may coordinate with the selected broadcasting APs so they do not perform the broadcast for the filtered packet.

FIG. 1 shows an operating environment 100 for providing broadcast operations by a selected subset of Access Points. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the W LAN for client devices). The plurality of APs may comprise a first AP 115, a second AP 120, a third AP 125, a fourth AP 130, a fifth AP 135, a sixth AP 140, a seventh AP 145, and an eighth AP 150. The plurality of APs may provide wireless network access to a plurality of client devices as they move within coverage environment 110. The plurality of client devices may comprise, but are not limited to, a first client device 155, a second client device 160, a third client device 165, and a fourth client device 170. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs may be compatible with specification standards such as, but not limited to, the Institute of Electrical and Electronics Engineers (IEEE) 802.11 specification standard for example.

While FIG. 1 shows the plurality of AP comprising eight APs, embodiments of the disclosure may comprise any number of APs and is not limited to eight. Similarly, while FIG. 1 shows the plurality of client devices comprising four client devices, embodiments of the disclosure may comprise any number of client devices and is not limited to four.

Controller 105 may comprise a Wireless Local Area Network controller (WLC) and may provision and control coverage environment 110 (e.g., a WLAN). Controller 105 may allow first client device 155, second client device 160, third client device 165, and fourth client device 170 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide broadcast operations by a selected subset of Access Points.

The elements described above of operating environment 100 (e.g., controller 105, first AP 115, second AP 120, third AP 125, fourth AP 130, fifth AP 135, sixth AP 140, seventh AP 145, eighth AP 150, first client device 155, second client device 160, third client device 165, and fourth client device 170) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 8, the elements of operating environment 100 may be practiced in a computing device 800.

Figure 2:
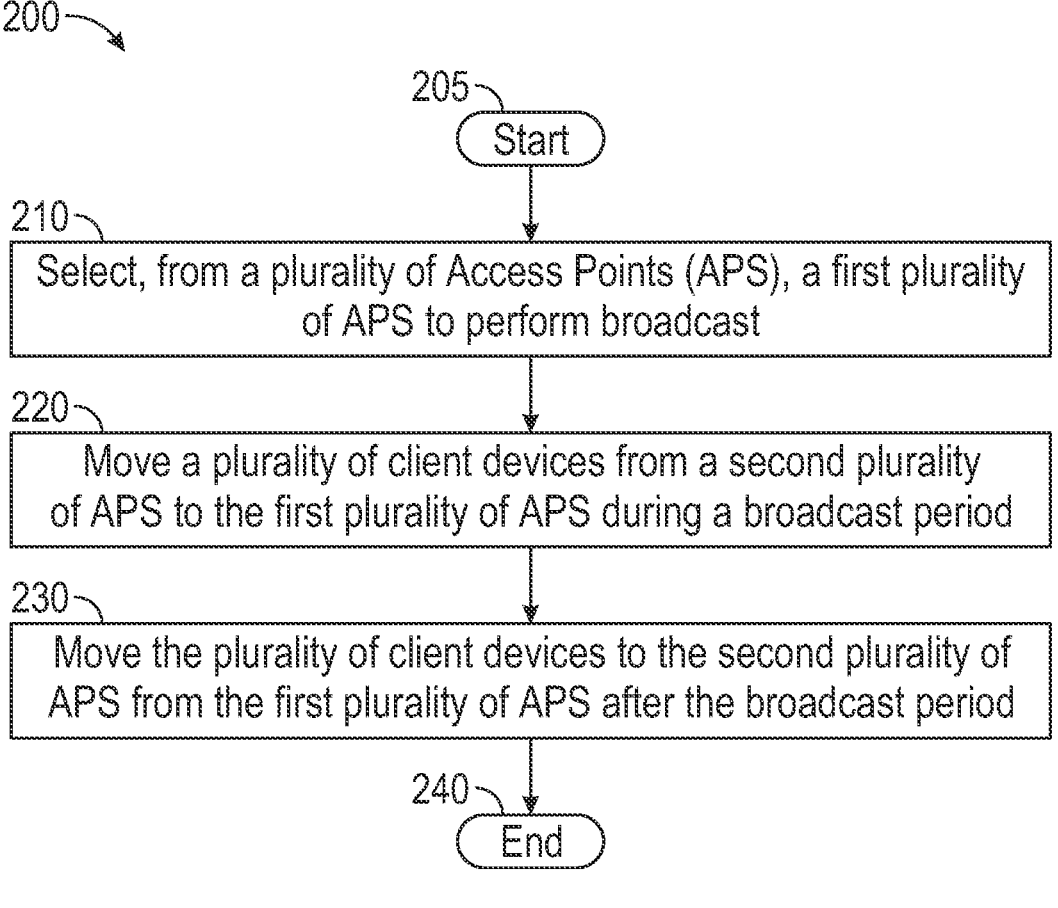
FIG. 2 is a flow chart of a method for providing broadcast operations by a selected subset of Access Points.

FIG. 2 is a flow chart setting forth the general stages involved in a method 200 consistent with embodiments of the disclosure providing broadcast operations by a selected subset of Access Points. Method 200 may be implemented using computing device 800 (e.g., controller 105) as described in more detail above with respect to FIG. 1. Ways to implement the stages of method 200 will be described in greater detail below.

Figure 3:
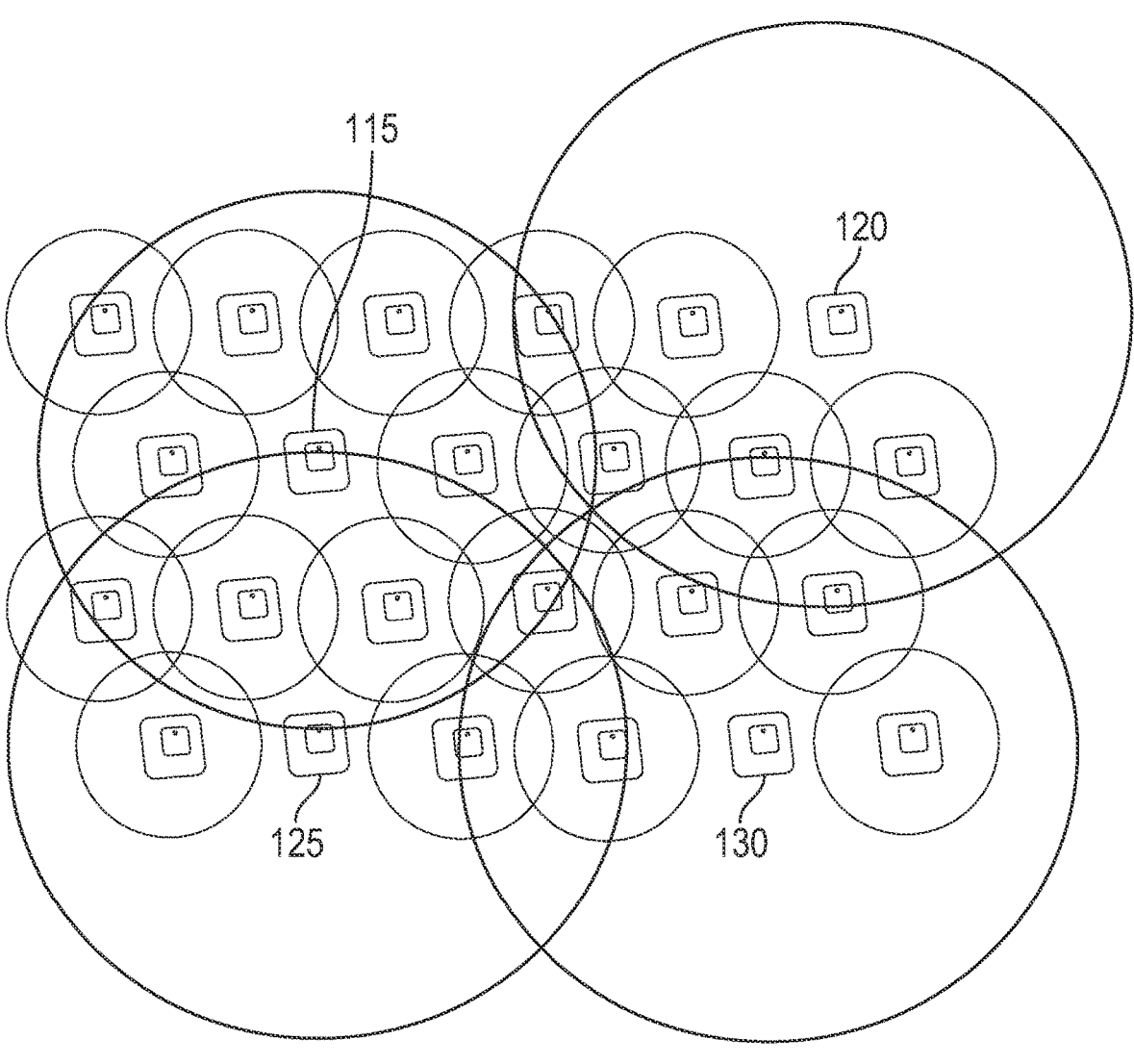
FIG. 3 illustrates broadcast ranges and unicast ranges.

Method 200 may begin at starting block 205 and proceed to stage 210 where computing device 800 may select, from a plurality of Access Points (APs), a first plurality of APs to perform broadcast. For example, embodiments of the disclosure may be directed toward reducing the number of broadcasts sent over a given floor in a dense deployment, while maximizing a utility area of each broadcast message. This may be achieved by reducing the number of APs that perform the broadcasts, as illustrated in FIG. 3, with the broadcast ranges represented as the wider circles while the unicast ranges are represented by the smaller circles. The client devices may be moved to the broadcast APs during the synchronized broadcast periods using wireless messages (e.g., 802.11 messages) that may instruct the client devices when to move to a broadcasting AP and for how long. As shown in FIG. 3, the first plurality of APs to perform broadcast may comprise first AP 115, second AP 120, third AP 125, and fourth AP 130. The second plurality of APs to perform unicast may comprise the remainder of the plurality of APs including, but not limited to, fifth AP 135, sixth AP 140, seventh AP 145, and eighth AP 150.

Unless filtering activities take place, all APs that serve the same Virtual Local Area Network (VLAN) may have to send the same broadcast packets at each broadcast period. Embodiments of the disclosure may coordinate the APs so they synchronize their beacons and agree on a common Modulation Coding Scheme (MCS) for broadcast. This way, they may start and complete their broadcast rounds at the same time, each on their respective channel.

The client devices may be instructed to switch to an alternate AP for the common broadcast windows, after which the client devices may resume unicast exchanges with their preferred AP. If filtering takes place (e.g., a broadcast is sent as unicast) then the AP to which the client device is associated with may remain responsible for the unicast, and the AP may coordinate with the next round broadcasting APs so they do not perform the broadcast for that filtered frame. During that common broadcast window, the non-broadcasting APs (e.g., unicast APs) may be free to perform other tasks on other channels (e.g., estimating the broadcast coverage of one another or other Radio Resource Management (RRM) operations).

Constellation Forming

Figure 4:
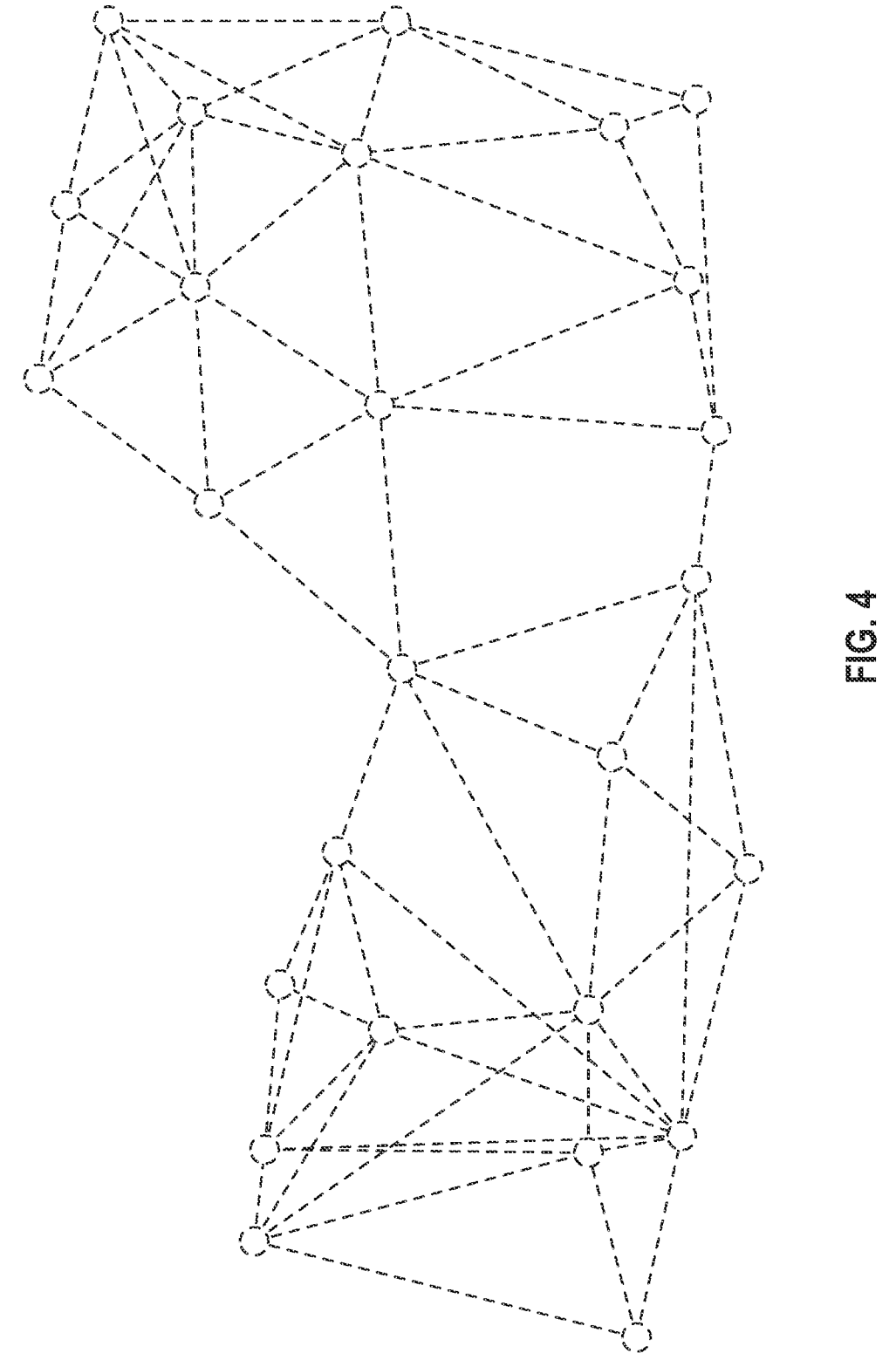
FIG. 4 illustrates formation of a constellation.

APs may be deployed across a (e.g., factory, office, etc.) floor. There may be Radio Frequency (RF) overlap between cells. As illustrated by FIG. 4, a constellation may be formed between APs, resulting in APs having a graph understanding of their relative positions. For example, a given AP may not know if it is in the "lower west corner", but it may know that it is at the edge of the graph and which APs are its neighbors. Controller 105 may know which APs have a unicast (high speed) range that is within the broadcast domain (and not in range) of each other, in which case a broadcast by one would cover the client devices associated to the other. This knowledge may be built from initial beacons and/or Internet Protocol Version 6 (IPv6) Neighbor Discovery (ND) protocol messages exchanged between APs.

Establish a Broadcast Coverage Zone

Figure 5:
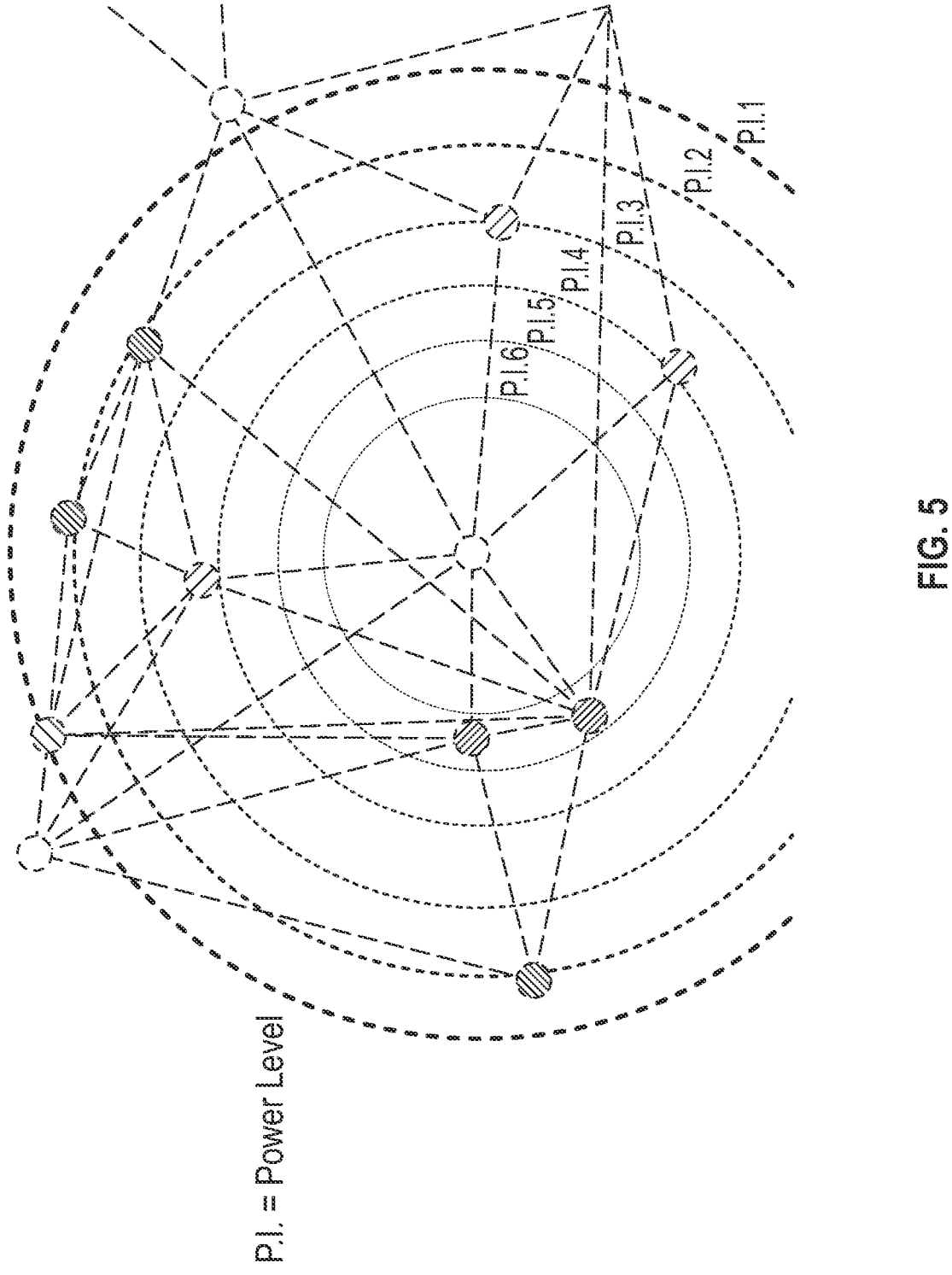
FIG. 5 illustrates establishing a broadcast coverage zone.

As illustrated by FIG. 5, embodiments of the disclosure may establish a broadcast coverage zone per AP. APs may meet on a given channel at agreed upon times (NDP scheduling or other mechanism). Each AP usually operating on that channel may send broadcast messages at decreasing power. Other APs report to controller 105 the messages they detected.

Evaluate Power for Each AP

Figure 6:
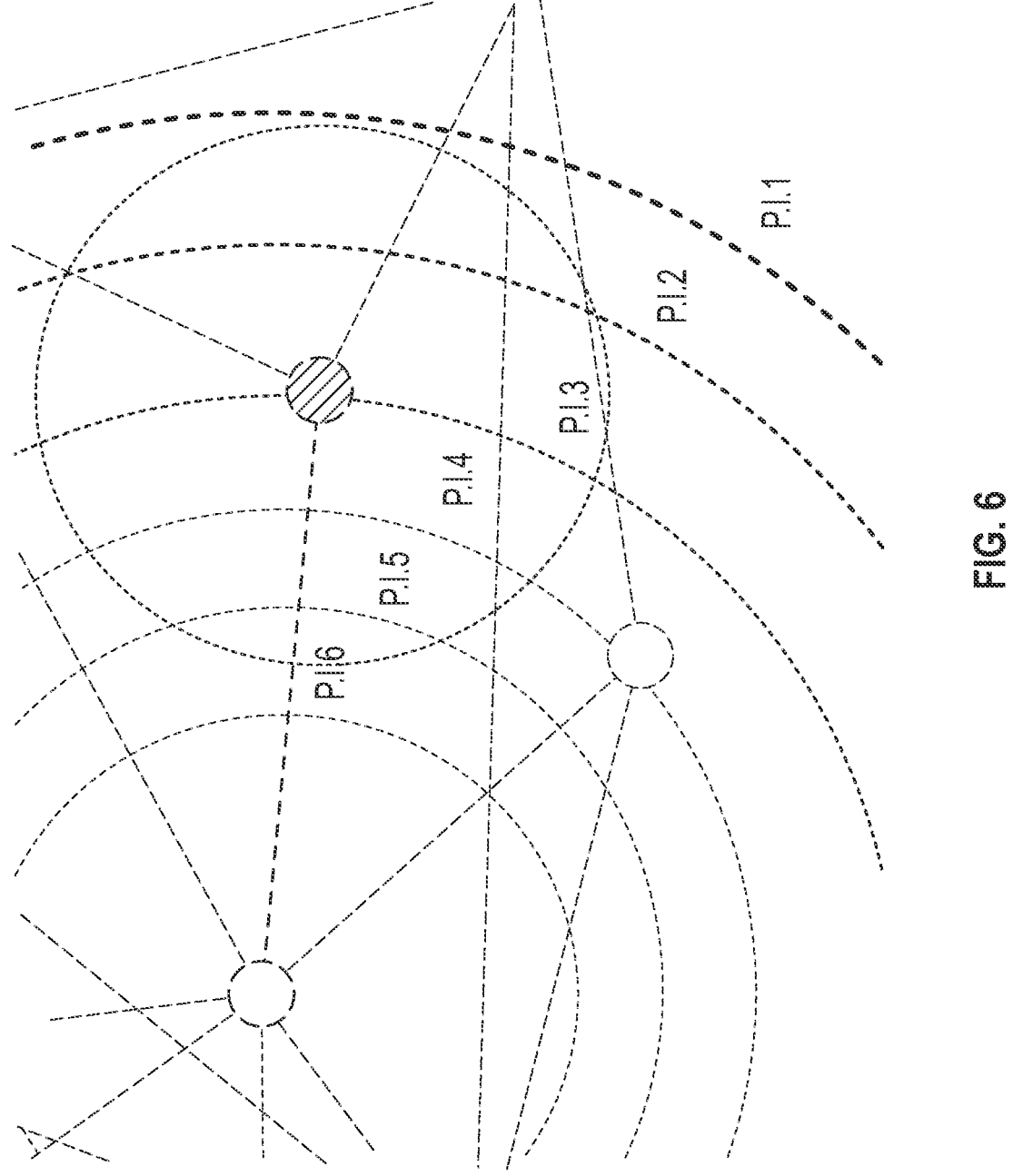
FIG. 6 illustrates evaluating power.

Controller 105 may then evaluate all APs current power, thus their cell likely radius, to project the probability of Basic Service Set (BSS) coverage for any broadcasting AP. As illustrated by FIG. 6, the broadcasting AP may be heard by its target neighbor as soon as power level 3 (e.g., 12 dBm) is reached for example. The target neighbor may operate at power level 5 (e.g., 6 dBm) for example. The RF distance between APs (on the graph) is close to log-linear. Thus, by increasing its transmit power by 6 dBm (power level 1), the broadcasting AP may reach 0.98 probability of covering the entirety of the target AP cell.

Determine a Minimum Set of APs

Figure 7:
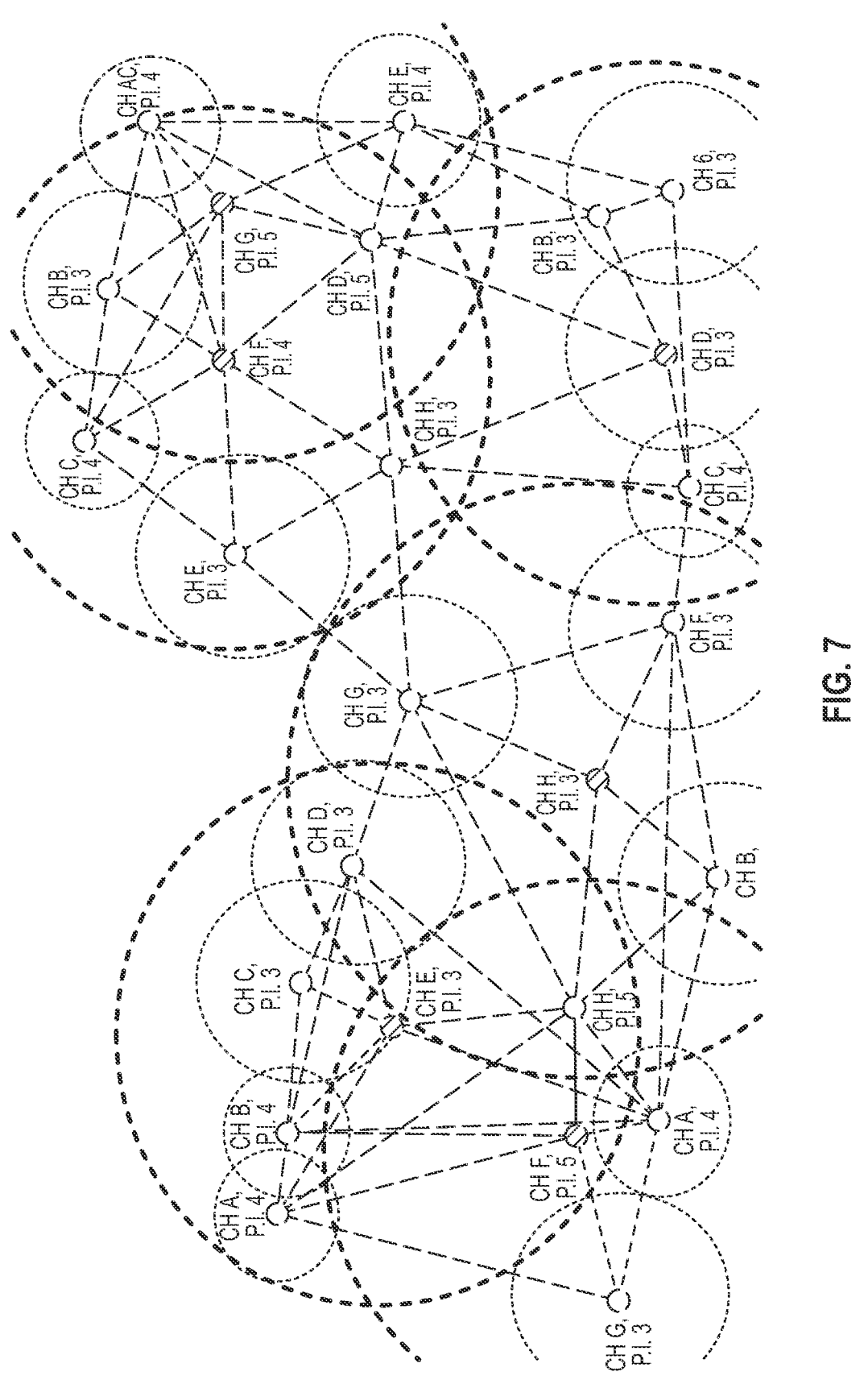
FIG. 7 illustrates determining a minimum sets of APs.

As illustrated by FIG. 7, embodiments of the disclosure may determine a minimum sets of APs required to cover the entire VLAN/Extended Service Set (ESS) on the covered area (e.g., the building floor). This may comprise a constrained optimization problem that finds which APs broadcasts are likely to reach the largest parts of other APs BSSs, based on these APs current power level (and thus their respective BSS size).

There may be zones that may not fully be covered by the determined set. Embodiments of the disclosure may allow this partial coverage, based on the determination of the likelihood that broadcast clients may be present in the uncovered areas.

Controller 105 may then configure the ESS so that only the designated APs (e.g., first plurality of APs) transmit broadcasts. In a first embodiment, this restriction may be limited to data-bearing broadcasts. In a second embodiment, the restriction may include beacons and other Layer 2 (L2) management broadcast frames.

Next, in the aforementioned first embodiment, client devices may discover the network by sending probe requests (and thus discover all APs) and listening to beacons. In the aforementioned second embodiment, only the AP subset may be discovered through passive scanning.

Embodiments of the disclosure may inform the client devices about the broadcast channels and intervals. In a first embodiment, controller 105 may distribute to all APs on the floor the channel and broadcast intervals of the broadcast-designated APs for the next round of broadcast, based on the observed broadcast frames for the next round, and the common MCS. The APs then forward the broadcasts they receive to those designated APs. In one embodiment, each AP unicasts each broadcast packet they receive to each of the designated APs. In another embodiment, the APs form a multicast distribution group over the Differentiated Services (DS), and each AP (or the WLC) forwards to that group the received broadcasts. The designated APs subscribe to the multicast group. In another embodiment, the APs exchange messages over the DS to establish L2 proximity. When such proximity is found, the designated APs may be expected to receive the same broadcasts as the other APs, and thus the other APs refrain from forwarding these broadcast messages.

When a client device joins a BSS, the AP forwards to the client device the channel(s) and intervals at which broadcasts may be sent. In one embodiment, the information may comprise a list of channels, transmitting BSSID, interval, and next broadcast time (based on local AP Timing synchronization function (TSF)), augmenting 802.11k neighbor list. The AP also transmits (e.g., after the 4-way handshake) the associated group key of each designated AP. In another embodiment, the information also includes a broadcast qualifier along with the above. The transport augments 802.11aq, but occurs post-association. The client device may then send a null frame with the power bit set to its current AP, tune to the target channel, and receive the intended broadcast before returning to the active channel.

In another embodiment, this process may augment 802.11v, by allowing the client device to request its local AP to unicast the broadcast traffic (while Directed Multicast Service (DMS) may only care about multicast traffic received while the client device was sleeping), thus suppressing the need for the client device to move to another channel. In that embodiment, DMS may be augmented to allow the client device to designate the broadcast traffic of interest as above, but also the transmission interval.

From stage 210, where computing device 800 selects, from the plurality of Access Points (APs), the first plurality of APs to perform broadcast, method 200 may advance to stage 220 where computing device 800 may move a plurality of client devices from a second plurality of APs to the first plurality of APs during a broadcast period. For example, the second plurality of APs may be preferred APs for the plurality of client devices. However, the client devices may be instructed to switch to an alternate AP (i.e., the first plurality of APs) for the synchronized broadcast periods.

Once computing device 800 moves the plurality of client devices from the second plurality of APs to the first plurality of APs during the broadcast period in stage 220, method 200 may continue to stage 230 where computing device 800 may move the plurality of client devices to the second plurality of APs from the first plurality of APs after the broadcast period. For example, the client devices may be instructed to switch to an alternate AP (i.e., the first plurality of APs) for the synchronized broadcast periods, after which they may resume unicast exchanges with their preferred AP (i.e., the second plurality of APs). Once computing device 800 moves the plurality of client devices to the second plurality of APs from the first plurality of APs after the broadcast period in stage 230, method 200 may then end at stage 240.

Figure 8:
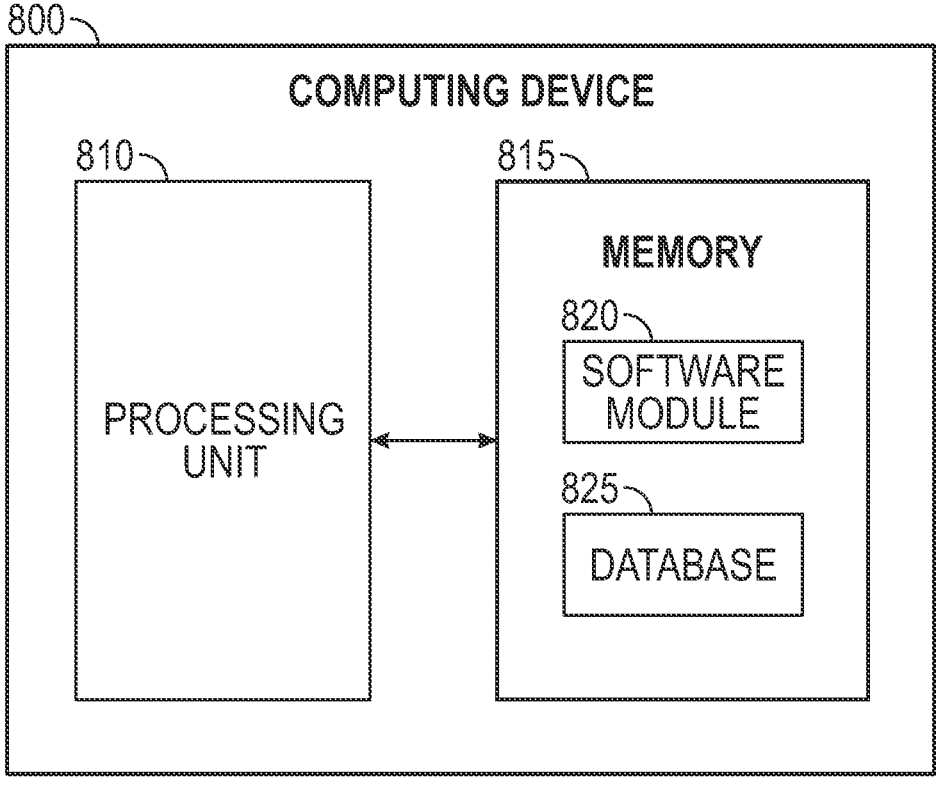
FIG. 8 is a block diagram of a computing device.

FIG. 8 shows computing device 800. As shown in FIG. 8, computing device 800 may include a processing unit 810 and a memory unit 815. Memory unit 815 may include a software module 820 and a database 825. While executing on processing unit 810, software module 820 may perform, for example, processes for providing broadcast operations by a selected subset of Access Points as described above with respect to FIG. 2. Computing device 800, for example, may provide an operating environment for controller 105, first AP 115, second AP 120, third AP 125, fourth AP 130, fifth AP 135, sixth AP 140, seventh AP 145, eighth AP 150, first client device 155, second client device 160, third client device 165, and fourth client device 170. Controller 105, first AP 115, second AP 120, third AP 125, fourth AP 130, fifth AP 135, sixth AP 140, seventh AP 145, eighth AP 150, first client device 155, second client device 160, third client device 165, and fourth client device 170 may operate in other environments and are not limited to computing device 800.

Computing device 800 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 800 may comprise any computer operating environment, such as hand-held devices, multiprocessor systems, microprocessor-based or programmable sender electronic devices, minicomputers, mainframe computers, and the like. Computing device 800 may also be practiced in distributed computing environments where tasks are performed by remote processing devices. The aforementioned systems and devices are examples, and computing device 800 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 800 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   selecting, from a plurality of Access Points (APs), a first plurality of APs to perform broadcast;
   moving a plurality of client devices from a second plurality of APs to the first plurality of APs during a broadcast period; and
   moving the plurality of client devices to the second plurality of APs from the first plurality of APs after the broadcast period.

2. The method of claim 1, wherein selecting, from the plurality of APs, the first plurality of APs comprises selecting a dominating set comprising the first plurality of APs.

3. The method of claim 2, wherein selecting the dominating set comprises:

forming a constellation between the plurality of APs;

establishing a broadcast coverage zone for each of the plurality of APs;

evaluating power for each of the plurality of APs; and determining a minimum set of the plurality of APs to cover an area to be the dominating set.

4. The method of claim 1, wherein the first plurality of APs synchronize their beacons during the broadcast period.

5. The method of claim 1, wherein the first plurality of APs use a common Modulation Coding Scheme (MCS) during the broadcast period.

6. The method of claim 1, further comprising performing, by the second plurality of APs during the broadcast period, a task during the broadcast period.

7. The method of claim 6, wherein the task comprises estimating a broadcast coverage of the second plurality of APs.

8. The method of claim 6, wherein the task comprises performing a Radio Resource Management (RRM) operation.

9. A system comprising:

a memory storage; and a processing unit coupled to the memory storage, wherein the processing unit is operative to:

select, from a plurality of Access Points (APs), a first plurality of APs to perform broadcast;

move a plurality of client devices from a second plurality of APs to the first plurality of APs during a broadcast period; and move the plurality of client devices to the second plurality of APs from the first plurality of APs after the broadcast period.

10. The system of claim 9, wherein the processing unit being operative to select, from the plurality of APs, the first plurality of APs comprises the processing unit being operative to select a dominating set comprising the first plurality of APs.

11. The system of claim 10, wherein the processing unit being operative to select the dominating set comprises the processing unit being operative to:

form a constellation between the plurality of APs;

establish a broadcast coverage zone for each of the plurality of APs;

evaluate power for each of the plurality of APs; and determine a minimum set of the plurality of APs to cover an area to be the dominating set.

12. The system of claim 9, wherein the first plurality of APs synchronize their beacons during the broadcast period.

13. The system of claim 9, wherein the first plurality of APs use a common Modulation Coding Scheme (MCS) during the broadcast period.

14. A non-transitory computer-readable medium that stores a set of instructions which when executed perform a method executed by the set of instructions comprising:

selecting, from a plurality of Access Points (APs), a first plurality of APs to perform broadcast;

moving a plurality of client devices from a second plurality of APs to the first plurality of APs during a broadcast period; and moving the plurality of client devices to the second plurality of APs from the first plurality of APs after the broadcast period.

15. The non-transitory computer-readable medium of claim 14, wherein selecting, from the plurality of APs, the first plurality of APs comprises selecting a dominating set comprising the first plurality of APs.

16. The non-transitory computer-readable medium of claim 15, wherein selecting the dominating set comprises:

forming a constellation between the plurality of APs;

establishing a broadcast coverage zone for each of the plurality of APs;

evaluating power for each of the plurality of APs; and determining a minimum set of the plurality of APs to cover an area to be the dominating set.

17. The non-transitory computer-readable medium of claim 14, wherein the first plurality of APs synchronize their beacons during the broadcast period.

18. The non-transitory computer-readable medium of claim 14, wherein the first plurality of APs use a common Modulation Coding Scheme (MCS) during the broadcast period.

19. The non-transitory computer-readable medium of claim 14, further comprising performing, by the second plurality of APs during the broadcast period, a task during the broadcast period.

20. The non-transitory computer-readable medium of claim 19, wherein the task comprises estimating a broadcast coverage of the second plurality of APs.

* * * * *